(12) United States Patent
Mooijman et al.

(10) Patent No.: US 6,866,313 B2
(45) Date of Patent: Mar. 15, 2005

(54) BUMPER ASSEMBLY INCLUDING AND ENERGY ABSORBER

(75) Inventors: Frank Mooijman, Halsteren (NL); Stephen F. Shuler, Royal Oak, MI (US); Alok Nanda, Bangalore (IN)

(73) Assignee: General Electric Co., Pittsfield, MA (US)

( * ) Notice: Subject to any disclaimer, the term of this patent is extended or adjusted under 35 U.S.C. 154(b) by 0 days.

(21) Appl. No.: 10/678,762

(22) Filed: Oct. 3, 2003

(65) Prior Publication Data

US 2004/0066048 A1 Apr. 8, 2004

Related U.S. Application Data

(63) Continuation-in-part of application No. 10/182,791, filed as application No. PCT/US01/51274 on Oct. 29, 2001, now Pat. No. 6,726,262.

(51) Int. Cl.$^7$ .............................................. B60R 19/18
(52) U.S. Cl. ..................................... 293/120; 293/121
(58) Field of Search ................................ 293/120, 121, 293/122, 133

(56) References Cited

U.S. PATENT DOCUMENTS

| | | | |
|---|---|---|---|
| 3,884,455 A | 5/1975 | Weller et al. | |
| 3,897,095 A | * 7/1975 | Glance et al. | 293/120 |
| 3,997,207 A | 12/1976 | Norlin | |
| 5,056,840 A | 10/1991 | Eipper et al. | |
| 5,219,197 A | 6/1993 | Rich et al. | |
| 5,269,574 A | 12/1993 | Bhutani et al. | |
| 5,425,561 A | 6/1995 | Morgan | |
| 5,984,389 A | 11/1999 | Nuber et al. | |
| 5,988,713 A | 11/1999 | Okamura et al. | |
| 6,179,355 B1 | 1/2001 | Chou et al. | |
| 6,247,745 B1 | 6/2001 | Carroll, III et al. | |
| 6,286,879 B1 | 9/2001 | Haque et al. | |
| 6,354,641 B1 | 3/2002 | Schroeder et al. | |
| 6,398,275 B1 | * 6/2002 | Hartel et al. | 293/102 |
| 6,406,081 B1 | 6/2002 | Mahfet et al. | |
| 6,443,513 B1 | 9/2002 | Glance | |
| 6,511,109 B1 | 1/2003 | Schultz et al. | |
| 6,575,510 B2 | * 6/2003 | Weissenborn | 293/121 |
| 6,669,251 B2 | * 12/2003 | Trappe | 293/120 |

OTHER PUBLICATIONS

Plastics Handbook, 1994, McGraw–Hill, Inc. , pp. 64 and 65.*

* cited by examiner

*Primary Examiner*—Jason Morrow

(57) ABSTRACT

A bumper system for an automobile vehicle includes a beam configured to attached to vehicle rails and an energy absorber coupled to the beam. The energy absorber is tunable for meeting predetermined criteria for both low speed and pedestrian impacts, and includes a flanged frame for attachment to the beam, a body that includes a plurality of lobes extending from the flanged frame and spaced apart from each other. Each lobe includes first and second side walls, having a concave shape.

24 Claims, 5 Drawing Sheets

BUMPER ASSEMBLY INCLUDING AND ENERGY ABSORBER

CROSS REFERENCE TO RELATED APPLICATIONS

This application is a continuation-in-part of U.S. patent application Ser. No. 10/182,791 filed Jul. 30, 2002, U.S. Pat. No. 6,726,262 which claims the benefit of International Application No. PCT/US01/51274 filed Oct. 29, 2001.

BACKGROUND OF THE INVENTION

This invention relates generally to bumpers and, more particularly, to energy absorbing vehicle bumper systems.

A known standard which bumper systems often are designed to meet is the United States Federal Motor Vehicle Safety Standard (FMVSS). For example, some energy absorbing bumper systems attempt to reduce vehicle damage as a result of a low speed impact by managing impact energy and intrusion while not exceeding a rail load limit of the vehicle. In addition, some bumper systems attempt to reduce pedestrian injury as a result of an impact.

A bumper system typically includes a beam that extends widthwise across the front or rear of a vehicle and is mounted to rails that extend in a lengthwise direction. The beam typically is steel, and the steel beam is very stiff and provides structural strength and rigidity. To improve the energy absorbing efficiency of a bumper system, some bumper systems also include shock absorbers.

The efficiency of an energy absorbing bumper system, or assembly, is defined as the amount of energy absorbed over distance, or the amount of energy absorbed over load. A high efficiency bumper system absorbs more energy over a shorter distance than a low energy absorber. High efficiency is achieved by building load quickly to just under the rail load limit and maintaining that load constant until the impact energy has been dissipated.

To improve the energy absorbing efficiency, shock absorbers sometimes are positioned, for example, between the steel bumper beam and the vehicle rails. The shock absorbers are intended to absorb at least some of the energy resulting from an impact. Adding shock absorbers to a bumper assembly results in an added cost and complexity as compared to a steel beam. The shocks also add weight to the bumper assembly, which is also undesirable since such added weight may reduce the overall fuel efficiency of the vehicle.

Other known energy absorbing bumper systems include a foam energy absorber. Foam based energy absorbers typically have slow loading upon impact, which results in a high displacement. Further, foams are effective to a sixty or seventy percent compression, and beyond that point, foams become incompressible so that the impact energy is not fully absorbed. The remaining impact energy is absorbed through deformation of the beam and/or vehicle structure.

BRIEF SUMMARY OF THE INVENTION

In one aspect, a bumper system for an automobile vehicle is provided. The vehicle includes vehicle rails. The bumper system includes a beam configured to attached to vehicle rails and an energy absorber coupled to the beam. The energy absorber is tunable for meeting predetermined criteria for both low speed and pedestrian impacts, and includes a flanged frame for attachment to the beam, a body that includes a plurality of lobes extending from the flanged frame and spaced apart from each other. Each lobe includes first and second side walls, having a concave shape.

In another aspect, a bumper assembly for an automobile vehicle having vehicle rails is provided. The bumper assembly includes a beam configured to attached to vehicle rails, an energy absorber coupled to the beam, and a fascia attachable to the energy absorber to substantially envelop the beam and the energy absorber. The energy absorber is tunable for meeting predetermined criteria for both low speed and pedestrian impacts, and includes a flanged frame for attachment to the beam, a body that includes a plurality of lobes extending from the flanged frame and spaced apart from each other. Each lobe includes first and second side walls, having a concave shape.

In another aspect, an energy absorber for a vehicle bumper system is provided. The energy absorber is tunable for meeting predetermined criteria for both low speed and pedestrian impacts, and includes a flanged frame and, a body that includes a plurality of lobes extending from the flanged frame and spaced apart from each other. Each lobe includes first and second side walls, having a concave shape.

DETAILED DESCRIPTION OF THE INVENTION

A bumper system that includes a tunable energy absorber is described below in detail. In an example embodiment, an energy absorber of the non-foam type is attached to a beam. The beam is fabricated, for example, from steel, aluminum, or glass mat thermoplastic (GMT). The energy absorber, in the example embodiment, is fabricated from Xenoy® material and is tunable so as to meet desired impact criteria, e.g., pedestrian and low speed impacts. More particularly, a front portion of the energy absorber is tuned, and tunable, to absorb pedestrian leg form impact, and a rear portion of the energy absorber is tuned, and tunable, for low speed barrier and pendulum impact. Impact forces during the specified types of impacts are maintained just below a predetermined level by deforming the energy absorber and beam until the kinetic energy of the impact event has been absorbed. When the impact is over, the energy absorber returns substantially to its original shape and retains sufficient integrity to withstand subsequent impacts.

Although the bumper system is described below with reference to specific materials (e.g. Xenoy® material (commercially available from General Electric Company, Pittsfield, Mass.) for the energy absorber), the system is not limited to practice with such materials and other materials can be used. For example, the beam need not necessarily be a steel, aluminum, or GMT compression molded beam, and other materials and fabrication techniques can be utilized.

Generally, the energy absorber is selecting from materials that result in efficient energy absorption, and the beam materials and fabrication technique are selected to result in a stiff beam.

Figure 1:
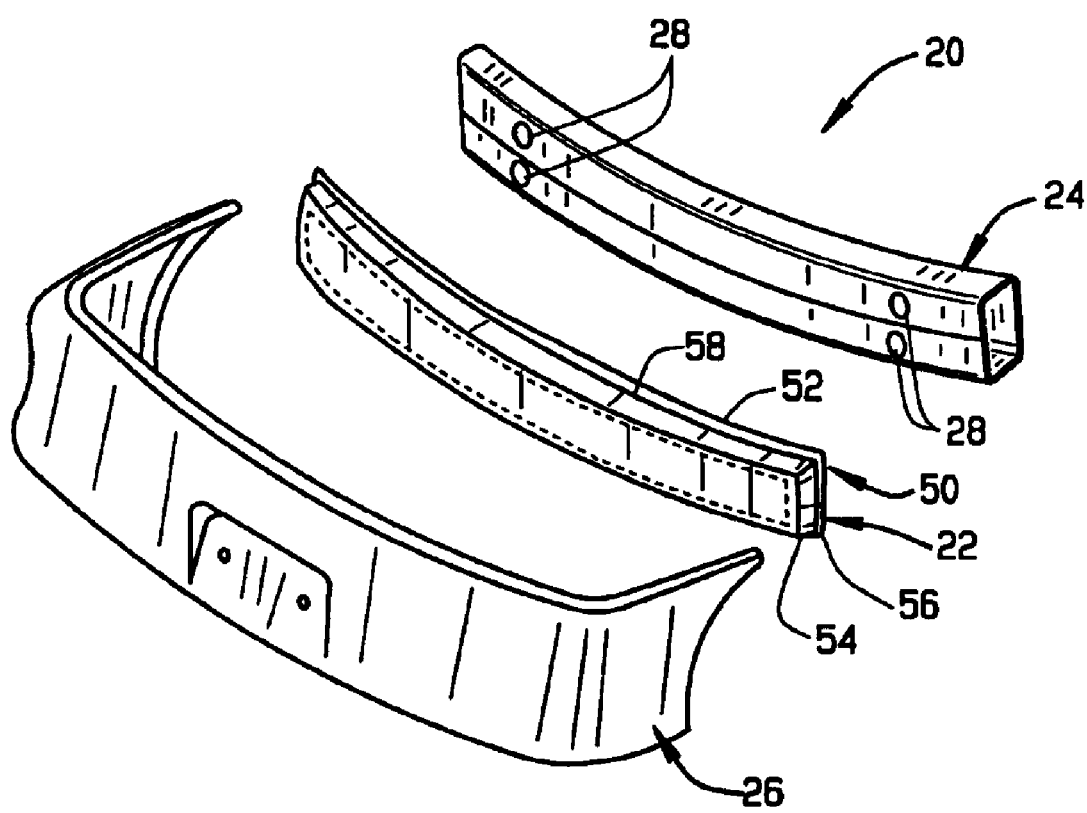
FIG. 1 is an exploded perspective schematic view of one embodiment of a bumper assembly including an energy absorber.

FIG. 1 is an exploded perspective view of one embodiment of a bumper system 20. System 20 includes an energy absorber 22 and a beam 24. Energy absorber 22 is positioned between beam 24 and a fascia 26 which, when assembled, form a vehicle bumper. As should be understood by those skilled in the art, beam 24 is attached to lengthwise extending frame rails (not shown).

Fascia 26 typically is generally formed from a thermoplastic material amenable to finishing utilizing conventional vehicle painting and/or coating techniques. Generally, fascia 26 envelops both energy absorber 22 and reinforcing beam 24 such that neither component is visible once attached to the vehicle.

Beam 24, in the example embodiment, is fabricated from extruded aluminum. In other embodiments, beam 24 is fabricated from roll formed steel or a compression molded glass mat thermoplastic (GMT). Beam 24 can have one of multiple geometries, including being configured as a B-section, a D-section, an I-beam, or having a C or W cross-sectional shape. The geometry of beam 24 is selected to provide a desired section modulus depending on the particular application in which the beam is to be used. Beam 24 includes rail attachment openings 28 so that bolts (not shown) can pass therethrough to secure bumper system 20 to the frame rails.

Energy absorber 22 includes a frame 50 having first and second longitudinally extending flanges 52 and 54, respectively, which overlap beam 24. Absorber 22 further includes a body 58 that extends outward from frame 50. The specific configuration of body 58 is illustrated and described below in connection with FIGS. 2, 3, and 4.

Figure 2:
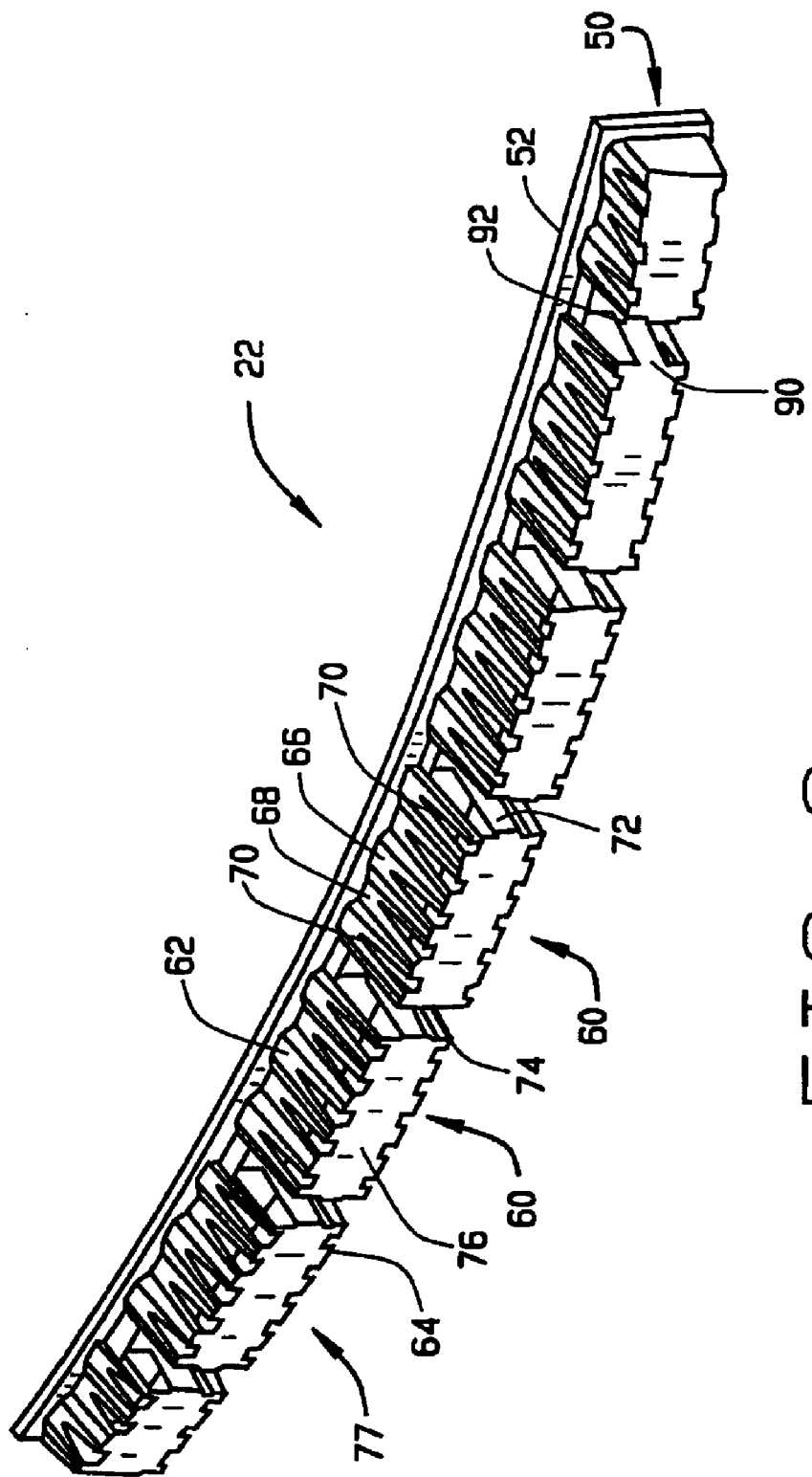
FIG. 2 is a front perspective schematic view of the energy absorber.
Figure 3:
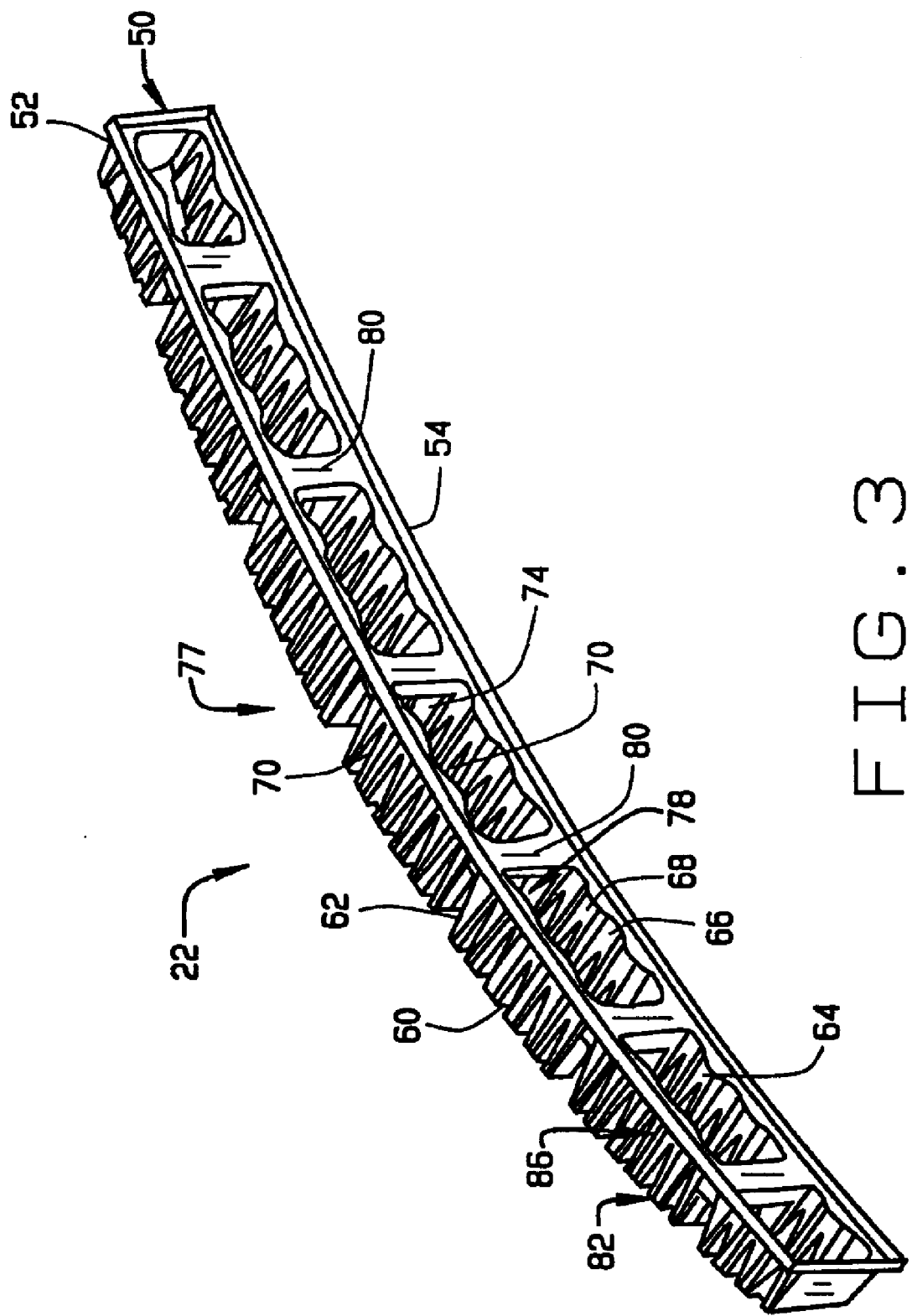
FIG. 3 is a rear perspective schematic view of the energy absorber shown in FIG. 2.
Figure 4:
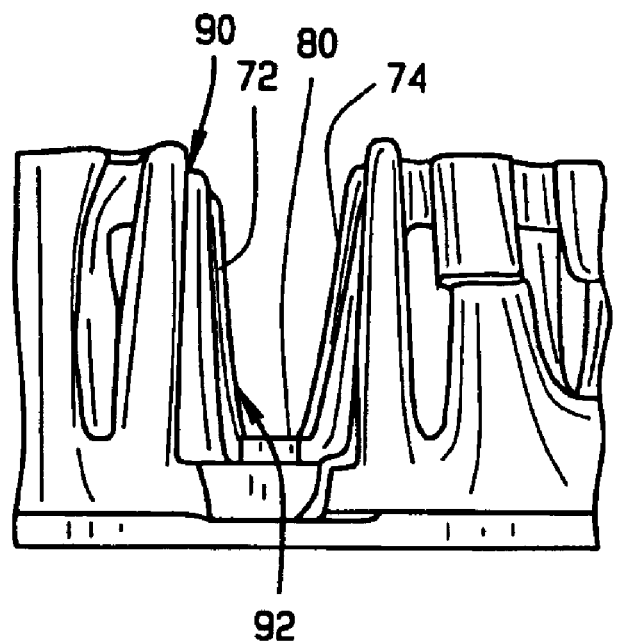
FIG. 4 an top schematic view of a portion of the energy absorber shown in FIGS. 2 and 3.

Referring now to FIGS. 2, 3, and 4, energy absorber body 58, sometimes referred to herein as a front portion, includes a plurality of lobes 60 extending from frame 50 between flanges 52 and 54. Each lobe 60 is spaced apart from each other and includes a first transverse wall 62 and a second transverse wall 64. Transverse walls 62 and 64 are rippled and include alternating raised areas 66 and depressed areas 68 which provide the transverse walls with an added degree of stiffness to resist deflection upon impact. Transverse walls 62 and 64 further include a plurality of teardrop shaped windows or openings 70. The width and depth dimensions of the ripples, as well as the dimensions of openings 70, can be modified to achieve different stiffness characteristics as desired. Each lobe 60 also includes a first side wall 72 and a second side wall 74. An outer wall 76 extends between the distal ends of traverse walls 62 and 64, and side walls 72 and 74 to form a tunable hollow crush box 77 having a cavity 78 defined by traverse walls 62, 64, side walls 72, 74, and outer wall 76. Also, a strap member 80 is located between each lobe 60. Strap members extend between flanges 52 and 54 of frame 50 and prevent energy absorber 22 from "opening" during an impact event.

In the example embodiment, side walls 72 and traverse walls 62 and 64 vary linearly in thickness from a first front-most portion 82 to a rearmost portion 86. In one embodiment, the wall thickness varies from about 1 millimeter (mm) to about 7 mm, in another embodiment, from about 1.5 mm to about 5 mm, and still another embodiment, from about 2.5 mm to about 3.5 mm. In further embodiments, the thickness of the walls is constant from front-most portion 82 to rearmost portion 86 and is between about 1 mm to about 7 mm. In still further embodiments, the thickness of the walls are stepped. Particularly, the thickness of the walls of front-most portion 82 is constant and the thickness of the walls of rearmost portion 86 is constant with the walls of rearmost portion 86 thicker than the walls of front-most portion 82.

Energy absorber 22 is tunable in that by selecting a thickness of each portion 82 and 86, the response of energy absorber 22 can be altered depending on the application in which absorber 22 is used. For example, front portion 82 of energy absorber 22 is tuned, and tunable, to absorb pedestrian leg form impact, and rear portion 86 is tuned, and tunable, for low speed and pendulum impact.

Each lobe 60 can, of course, have any one of a number of different geometries depending on the impact energy requirements for the vehicle. Each lobe 60 has an axial crush mode in both barrier and pendulum impacts according to Federal Motor Vehicle Safety Standard (FMVSS) and also has a stiffness tunability in order to meet the desired impact load deflection criteria.

For example, the walls may have a thickness that broadly ranges from about 1.0 mm to about 7.0 mm. More specifically, for certain low speed or pedestrian impact applications the nominal wall thickness may generally range from about 1.0 mm to about 5.0 mm and for other applications, particularly those for a 5 mph FMVSS system, the nominal wall thickness for the side and rear walls would more likely be in the range of about 2.5 mm to 7.0 mm.

Another aspect in appropriately tuning energy absorber 22 is the selection of the thermoplastic resin to be employed. The resin employed may be a low modulus, medium modulus or high modulus material as needed. By carefully considering each of these variables, energy absorbers meeting the desired energy impact objectives can be manufactured.

The characteristics of the material utilized to form energy absorber 22 include high toughness/ductility, thermally stable, high energy absorption capacity, a good modulus-to-elongation ratio and recyclability. While the energy absorber may be molded in segments, the absorber also can be of unitary construction made from a tough plastic material. An example material for the absorber is Xenoy material, as referenced above. Of course, other engineered thermoplastic resins can be used. Typical engineering thermoplastic resins include, but are not limited to, acrylonitrile-butadiene-styrene (ABS), polycarbonate, polycarbonate/ABS blend, a copolycarbonate-polyester, acrylic-styrene-acrylonitrile (ASA), acrylonitrile-(ethylene-polypropylene diamine modified)-styrene (AES), phenylene ether resins, blends of polyphenylene ether/polyamide (NORYL GTX® from General Electric Company), blends of polycarbonate/PET/PBT, polybutylene terephthalate and impact modifier (XENOY® resin from General Electric Company), polyamides, phenylene sulfide resins, polyvinyl chloride PVC, high impact polystyrene (HIPS), low/high density polyethylene (l/hdpe), polypropylene (pp) and thermoplastic olefins (tpo).

Figure 5:
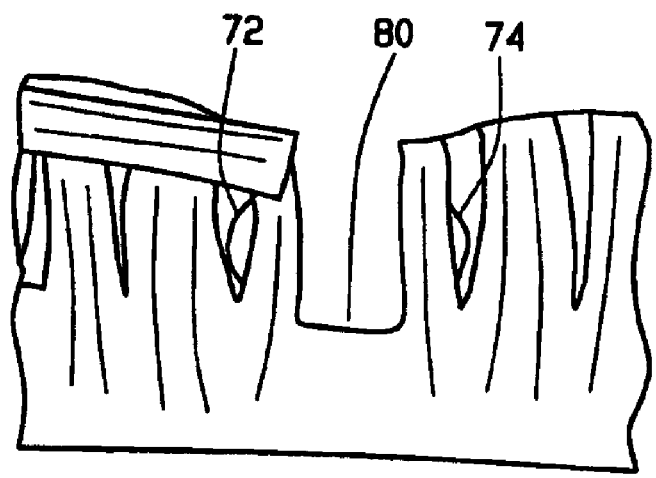
FIG. 5 is a top schematic view of the energy absorber shown in FIG. 4 during an impact.

As shown more clearly in FIG. 4, side walls 72 and 74 have a concave shape or profile between a front-most portion 90 add a rearmost portion 92. The concave shape encourages the deflection of side walls 72 and 74 into cavity 78 during an impact in the area of strap 80. This deflection of side walls 72 and 74 into cavity 78 during impact prevents a stack-up of material which could adversely affect the ability of energy absorber 22 to absorb energy. FIG. 5 shows energy absorber 22 during an impact in the area of strap 80 and the deflection of side walls 72 and 74 into cavity 78.

Figure 6:
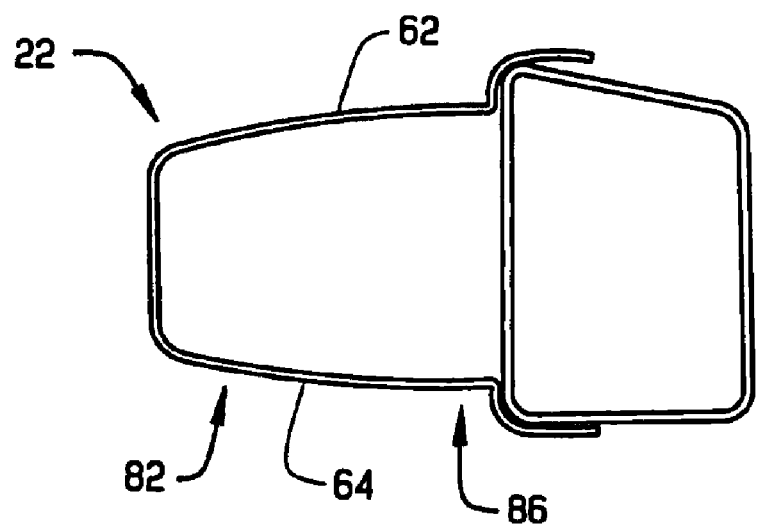
FIG. 6 is a sectional schematic view of the energy absorber shown in FIG. 2.
Figure 7:
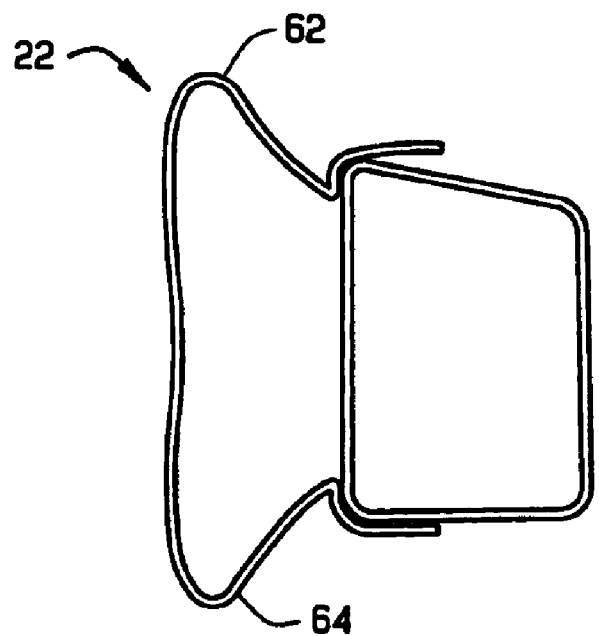
FIG. 7 is a sectional schematic view of the energy absorber shown in FIG. 6 during an impact.

As shown more clearly in FIG. 6, traverse walls 62 and 64 have a convex shape or profile between front-most portion 82 add rearmost portion 86. The convex shape encourages the deflection of traverse walls 62 and 64 away from cavity 78 during an impact. This deflection of traverse walls 62 and 64 away from cavity 78 during impact prevents a stack-up of material which could adversely affect the ability of energy absorber 22 to absorb energy. FIG. 7 shows energy absorber 22 during an impact and the deflection of traverse walls 62 and 64 away from cavity 78.

While the invention has been described in terms of various specific embodiments, those skilled in the art will recognize that the invention can be practiced with modification within the spirit and scope of the claims.

What is claimed is:

1. A bumper system for an automobile vehicle, the vehicle having vehicle having rails, said bumper system comprising:
   a beam configured to attach to vehicle rails; and
   an energy absorber coupled to said beam, said energy absorber being tunable for meeting predetermined criteria for both low speed and pedestrian impacts, said energy absorber comprising:
   a flanged frame for attachment to said beam;
   a body comprising a plurality of lobes extending from said flanged frame and spaced apart from each other, each said lobe comprising first and second side walls, said first and second side walls having a concave shape; and
   a strap member located between each adjacent lobe.

2. A bumper system in accordance with claim 1 wherein each said lobe comprises:
   a first traverse wall extending from said flanged frame; and
   a second traverse wall spaced apart from said first traverse wall and extending from said flanged frame, said first and second traverse walls extending between said first and second side walls.

3. A bumper system in accordance with claim 2 wherein each said lobe further comprises an outer wall, said first and second side walls, said first and second traverse walls, and said outer wall defining a hollow crush box.

4. A bumper system in accordance with claim 2 wherein said first and second traverse walls comprise openings of predetermined size and shape.

5. A bumper system in accordance with claim 4 wherein said first and second traverse walls comprise teardrop shaped openings.

6. A bumper system in accordance with claim 2 wherein said first and second side walls comprise openings of predetermined size and shape.

7. A bumper system in accordance with claim 1 wherein said energy absorber is injection molded.

8. A bumper system in accordance with claim 1 wherein said beam comprises at least one of steel, aluminum, thermoplastic, and glass mat thermoplastic.

9. A bumper system in accordance with claim 4 wherein said first and second spaced transverse walls are rippled.

10. A bumper assembly for an automotive vehicle having vehicle rails, said bumper assembly comprising:
    a beam configured to attach to vehicle rails;
    an energy absorber coupled to said beam, said energy absorber being tunable for meeting predetermined criteria for both low speed and pedestrian impacts, said energy absorber comprising:
    a flanged frame for attachment to said beam;
    a body comprising a plurality of lobes extending from said flanged frame and spaced apart from each other, each said lobe comprising first and second side walls, said first and second side walls having a concave shape;
    a strap member located between each adjacent lobe; and
    a fascia attachable to said energy absorber to substantially envelop said beam and said energy absorber.

11. A bumper assembly in accordance with claim 10 wherein each said lobe comprises:
    a first traverse wall extending from said flanged frame; and
    a second traverse wall spaced apart from said first traverse wall and extending from said flanged frame, said first and second traverse walls extending between said first and second side walls.

12. A bumper assembly in accordance with claim 11 wherein each said lobe further comprises an outer wall, said first and second side walls, said first and second traverse walls, and said outer wall defining a hollow crush box.

13. A bumper assembly in accordance with claim 11 wherein said first and second traverse walls and said first and second side walls comprise openings of predetermined size and shape.

14. A bumper assembly in accordance with claim 13 wherein said first and second traverse walls comprise teardrop shaped openings.

15. A bumper assembly in accordance with claim 10 wherein said energy absorber is injection molded.

16. A bumper assembly in accordance with claim 10 wherein said beam comprises at least one of steel, aluminum, thermoplastic, and glass mat thermoplastic.

17. A bumper assembly in accordance with claim 13 wherein said first and second spaced transverse walls are rippled.

18. An energy absorber for a vehicle bumper system, said energy absorber being tunable for meeting predetermined criteria for both low speed and pedestrian impacts and comprising:
    a flanged frame;
    a body comprising a plurality of lobes extending from said flanged frame and spaced apart from each other, each said lobe comprising first and second side walls, said first and second side walls having a concave shape; and
    a strap member located between each adjacent lobe.

19. An energy absorber in accordance with claim 18 wherein each said lobe comprises:
    a first traverse wall extending from said flanged frame; and
    a second traverse wall spaced apart from said first traverse wall and extending from said flanged frame, said first and second traverse walls extending between said first and second side walls.

20. An energy absorber in accordance with claim 19 wherein each said lobe further comprises an outer wall, said first and second side walls, said first and second traverse walls, and said outer wall defining a hollow crush box.

21. An energy absorber in accordance with claim 19 wherein said first and second traverse walls and said first and second side walls comprise openings of predetermined size and shape.

22. An energy absorber in accordance with claim 21 wherein said first and second traverse walls comprise teardrop shaped openings.

23. An energy absorber in accordance with claim 18 wherein said energy absorber is injection molded.

24. An energy absorber in accordance with claim 19 wherein said first and second spaced transverse walls are rippled.

* * * * *